Jan. 4, 1927.
O. T. NELSON
1,613,245
APPARATUS FOR INDICATING THE LEVEL OF LIQUID
Filed Oct. 11, 1922
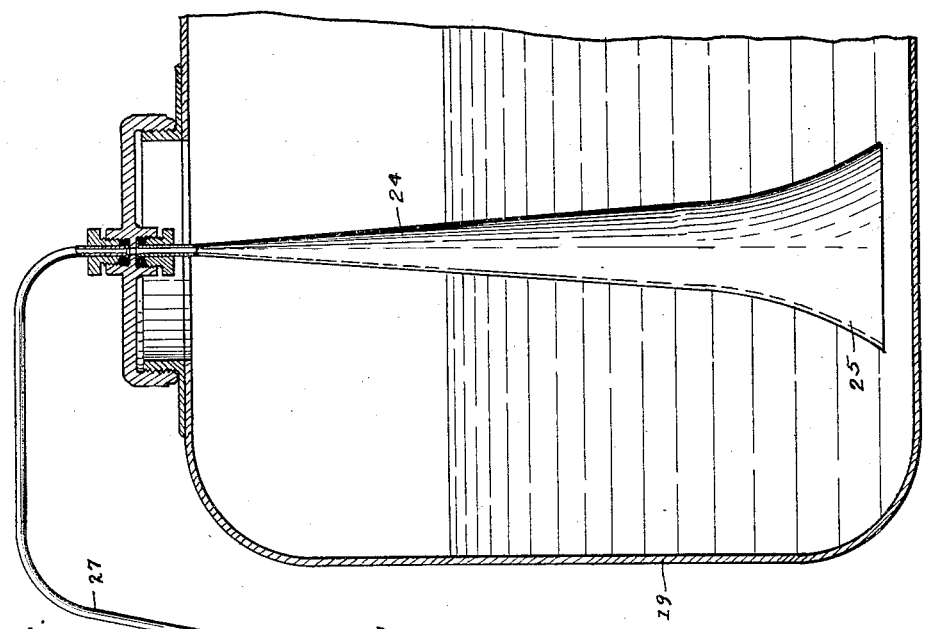
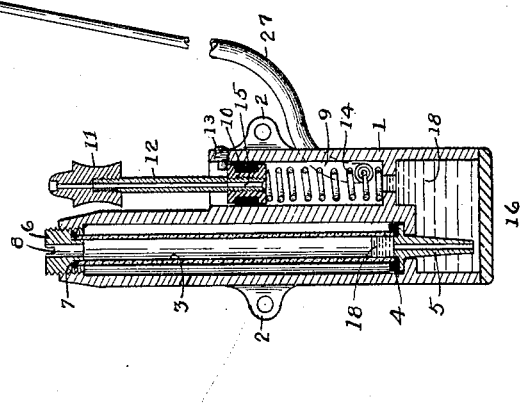
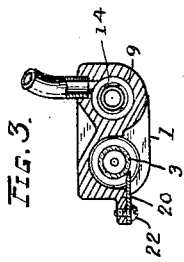
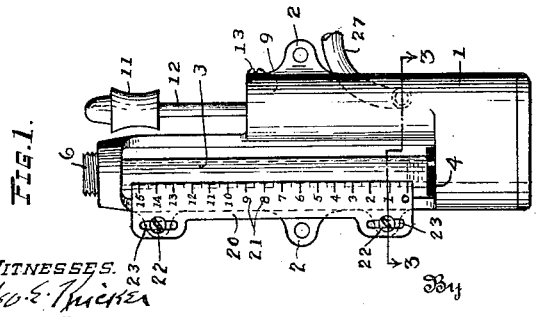
Inventor
OSCAR T NELSON.

Patented Jan. 4, 1927.

1,613,245

UNITED STATES PATENT OFFICE.

OSCAR T. NELSON, OF CLEVELAND, OHIO, ASSIGNOR TO THE NEMI PRODUCTS COMPANY, OF CLEVELAND, OHIO, A CORPORATION OF OHIO.

APPARATUS FOR INDICATING THE LEVEL OF LIQUID.

Application filed October 11, 1922. Serial No. 593,769.

This invention relates to improvements in gages, and more particularly to a manually operated device for indicating the quantity of liquid in a tank or receptacle, an object of the invention being to provide such a device which can be conveniently located on the instrument board of an automobile and when operated will show the quantity of gasoline in the tank.

A further object is to provide a device of the character stated which operates through the medium of a plunger given a uniform movement at each operation and effecting a confined column of air between the gage and the tank to cause a movement of an indicating fluid in a transparent tube.

A further object is to provide an improved conical air tube submerged in the liquid of the tank and connected with the gage, the purpose and function of which will more fully hereinafter appear.

With these and other objects in view, the invention consists in certain novel features of construction and combinations and arrangements of parts as will be more fully hereinafter described and pointed out in the claims.

In the accompanying drawings:

Figure 1 is a view in front elevation of my improved gage.

Figure 2 is a view in longitudinal section of the gage and showing its connection with the tank.

Figure 3 is a view in transverse section on the line 3—3 of Figure 1.

1 represents the body of my improved gage which may have perforated screw receiving ears 2 for conveniently attaching the gage to its support.

A sight tube 3 is mounted vertically in one side of the body 1 and is supported at its lower end on a gasket 4 resting on th enlarged upper end of an inlet nozzle 5 and at its upper end secured by a screw 6 screwed into the body with a gasket 7 interposed between the screw and tube, and having an air vent 8 communicating with the upper end of the sight tube.

The body 1 is formed with a longitudinal bore constituting a cylinder 9, in which a plunger 10 snugly fits and is mounted to move. The stroke of the plunger is uniform at each operation and this may be controlled in various ways. I have illustrated for the purpose a head 11 on the tubular plunger rod 12 which engages the upper end of the cylinder, and a screw 13 projected through the cylinder end engaged by the plunger on its up stroke, said up stroke being preferably caused by a coiled spring 14 located in the cylinder below the plunger and holding the plunger in its normal elevated position.

It will be noted that the plunger has an opening 15 communicating with the tubular plunger rod 12 so that the space below the plunger is in normal communication with the outside air.

The nozzle 5 projects into chamber 16 in the bottom of the body 1 which constitutes a receptacle for a colored liquid 18, preferably a light oil, which is caused to move in the sight tube 3 and indicate the quantity of liquid in a tank 19, as will be more fully hereinafter explained. This chamber 16 also communicates with the cylinder 9.

A plate 20, containing a scale 21 in gallons and fractions thereof, or containing any other indicia desired, is secured to the body 1 at one side of the sight tube 3 by means of screws 22, the latter being projected through slots 23, in the plate 20 to permit of adjustment of the plate as may be found desirable.

In the tank 19 I provide a conical or tapering tube 24 disposed in upright position and having its bell mouthed lower end 25 submerged in the liquid 6 and extending to a point adjacent the bottom of the tank.

The upper end of the tube 24 is secured in the top of the tank in any approved manner and is connected by a small diameter pipe 27 with the cylinder 9 above the liquid level in the latter.

The operation is as follows:

To ascertain the quantity of liquid in the tank 19, the operator places his finger on the upper end of plunger rod 12, closing the air inlet, and at the same time he presses the plunger 10 downwardly its full stroke. This stroke compresses the air in cylinder 9, pipe 27 and tube 24, and exerts pressure on the liquid 18 to force the same up the sight tube 3 to register with the scale 21 and give an accurate reading to the operator.

When pressure is relieved on the plunger, the spring 14 returns the same to normal position and air enters the cylinder when the finger is removed to restore the pressure to normal atmospheric pressure, and the liquid falls in the sight tube 3 to zero position.

The operation depends largely on the shape of the conical tube 24. It will be noted that as the liquid falls in the tank 19 the volume of air acted on by the plunger increases and hence the impression on the colored liquid 18 is correspondingly decreased, so that in exact proportion of the air acted on by the plunger the movement of the colored liquid is decreased or increased as the case may be.

Furthermore the frictional resistance to the movement of the liquid in tube 24 increases and decreases in accordance with the liquid level in the tube 24 with its corresponding effect on the movement imparted to the colored liquid, as it is to be understood that each stroke of the plunger is uniform.

The tube 24 is made flared or bell-mouthed at its lower end which permits the tank liquid to splash up inside of the tube and cause an irregular reading of the colored liquid so the operator knows the level is dangerously low, but sufficient gasoline is left to carry him to a service station.

While I have described my invention in the terms of air pressure, the plunger serving to compress the air, it is obvious that similar results might be obtained by moving a plunger or other element in a manner to cause a suction or partial vacuum, and control the indicating means thereby and I do not therefore limit myself to the use of pressure.

Various slight changes might be made in the general form and arrangement of parts described without departing from the invention, and hence I do not limit myself to the precise details set forth but consider myself at liberty to make such changes and alterations as fall within the spirit and scope of the appended claims.

No definite dimensions of the conically shaped member have been determined upon since it is only necessary to provide a tapering tube so that the upper reduced end will be disposed at the upper end of the tank 19 while the flared or enlarged end 25 will be adjacent the bottom of the tank. It appears, however, that the circumference of the large end of the tapering tube is an important factor in the successful operation of the device and that the cross sectional area at the lower end of the tube must be greater than the upper end in order to obtain the proper results. In other words, the funnel shaped member is employed instead of a straight tube due to the fact that as the level of the liquid falls in the tank 19 the area of the liquid in the member 24 will increase in proportion to the fall of said liquid so that the column of air in the tube 27 and the upper end of the member 24 must act upon a greater area of liquid in the tapering tube 24 as the liquid falls in the tank 19. It will be particularly noted that when the level of the liquid reaches a point adjacent the bottom of the tube 24 that the area of the liquid acted upon by the column of air in the tube 27 and the upper end of the tapering tube 24 will have materially increased so that the resistance to the forcing of the liquid out of the tapering tube will be such as to cause a definite pressure on the indicating liquid and which definite pressure will vary in accordance with the level of the liquid in the tank. Thus it will be seen that each time that the pump is operated at a uniform stroke the indicating liquid will always rise to a predetermined height for a predetermined level of the liquid in the tank 19 and said indicating liquid will always measure the exact amounts of liquid remaining in the tank in terms of the graduation 21 of the manometer.

What I claim is:

1. A device of the character described including a pressure responsive indicator, a tapering tube having an upper reduced end and a large end adapted to be submerged in a liquid to be measured, means establishing communication between the indicator and the upper reduced end of the tapering tube, said means and tapering tube confining a column of air normally at atmospheric pressure between the indicator and the level of the liquid in the tapering tube, an air pump provided with a passage for maintaining the column of air normally open to the atmosphere, said pump upon closing of said passage being adapted to be operated on the effective stroke to introduce a predetermined volume of air into the confined air between the indicator and the level of liquid in the tapering tube, said volume being sufficient only to slightly lower the level of the liquid in the tapering tube.

2. A device of the character described comprising a pressure responsive manometer graduated in terms of a liquid to be measured in a container, a tapering tube having its end of lesser diameter above the level of the liquid and its end of larger diameter submerged in said liquid, a pressure transmitting tube connecting the manometer with the reduced end of the tapering tube, said two tubes being adapted to confine a column of air between the manometer and the level of the liquid in the tapering tube, a pump connected to said pressure transmitting tube, there being means included in the pump for placing the column of air in communication with the atmosphere, said last mentioned means adapted to be closed when the pump is operated whereby said pump will introduce a predetermined volume of air into the confined air in the tubes, said volume being sufficient only to slightly lower the level of the liquid in the tapering tube.

3. A device of the character described including a pressure responsive gage, a tapering tube having an upper reduced end and an enlarged end adapted to be submerged in a liquid to be measured, means cooperating with the tapering tube and gage for confining a pressure transmitting column of fluid between the gage and the level of the liquid in the tapering tube, means for introducing a predetermined volume of air into the confined air between the gage and the level of the liquid in the tapering tube, said introducing means including means for maintaining the confined air in communication with the atmosphere, the communication being adapted to be closed when the predetermined volume of air is introduced into said confined air, said volume of air being sufficient only to slightly lower the level of the liquid in the tapering tube.

4. In combination with a U-tube having indicating liquid of constant volume therein, a tapering tube having an upper reduced end, and a large end adapted to be submerged in a liquid to be measured, a conduit for confining a column of air, and connecting one leg of the U-tube with the upper end of the tapering tube, a pump connected with the conduit between the tapering tube and the U-tube for introducing a predetermined volume of air into the conduit, said pump having a conduit open to the atmosphere for normally maintaining the column of air in the first mentioned conduit open to the atmosphere, said conduit adapted to be closed when the pump is actuated.

5. In combination with a U-tube having an indicating liquid of constant volume therein, a tapering tube having its large end adapted to be submerged in a liquid to be measured, a conduit connecting one leg of the U-tube with the upper end of the tapering tube, a pump cylinder forming a continuation of said conduit cooperating with said conduit to maintain a column of air between the U-tube and the tapering tube, a hollow plunger in the cylinder for introducing a predetermined volume of air into the conduit, said hollow plunger being open at one end for normally maintaining the cylinder in communication with the atmosphere, such open end being adapted to be closed when the plunger is operated, the level of the liquid in the tapering tube being normally in the same horizontal plane with the level of the liquid adapted to be measured.

6. In combination with a U-tube having an indicating liquid therein, a tapering tube having its large end adapted to be submerged in a liquid to be measured, a hollow means connecting the other end of the tapering tube and one leg of the U-tube and adapted to confine a column of air between the level of the liquid in the tapering tube and the indicating liquid of the U-tube, a pump cylinder connected with the hollow means between the tapering tube and the U-tube for introducing a predetermined volume of air into the column of air in the hollow connecting means, a plunger in the pump cylinder being provided with a passage therethrough for maintaining atmospheric pressure in the confined column of air between the indicator and the level of liquid in the tapering tube upon the return stroke of the plunger, said passage adapted to be closed during the effective stroke of the plunger, the level of the liquid in the tapering tube being normally in the same horizontal plane with the level of the liquid adapted to be measured.

OSCAR T. NELSON.